US010513066B2

(12) United States Patent
Kurano et al.

(10) Patent No.: US 10,513,066 B2
(45) Date of Patent: Dec. 24, 2019

(54) GASKET MOLDED PRODUCT AND METHOD OF MANUFACTURING THE SAME (71) Applicant: NOK CORPORATION, Tokyo (JP)

(72) Inventors: Yoshihiro Kurano, Kikugawa (JP); Toshihiro Shimazoe, Kikugawa (JP)

(73) Assignee: NOK CORPORATION (JP)

( * ) Notice: Subject to any disclaimer, the term of this patent is extended or adjusted under 35 U.S.C. 154(b) by 46 days.

(21) Appl. No.: 15/568,365

(22) PCT Filed: Mar. 25, 2016

(86) PCT No.: PCT/JP2016/059548
§ 371 (c)(1),
(2) Date: Oct. 20, 2017

(87) PCT Pub. No.: WO2016/170914
PCT Pub. Date: Oct. 27, 2016

(65) Prior Publication Data
US 2018/0104872 A1 Apr. 19, 2018

(30) Foreign Application Priority Data

Apr. 24, 2015 (JP) ................. 2015-089405

(51) Int. Cl.
B29C 45/14 (2006.01)
B29C 45/40 (2006.01)
(Continued)

(52) U.S. Cl.
CPC .... B29C 45/14008 (2013.01); B29C 45/1418 (2013.01); B29C 45/14754 (2013.01);
(Continued)

(58) Field of Classification Search
CPC .... B32B 2581/00; F16J 15/061; F16J 15/104; F16J 15/108; H01M 8/0273; H01M 8/0276; H01M 8/0286
See application file for complete search history.

(56) References Cited

U.S. PATENT DOCUMENTS 4,748,092 A * 5/1988 Hekal ................. H01M 8/0273
204/253
5,536,342 A * 7/1996 Reis ..................... H05K 9/0015
156/265
(Continued)

FOREIGN PATENT DOCUMENTS

CN 1973153 A 5/2007
CN 102132640 A 7/2011
(Continued)

OTHER PUBLICATIONS

Extended European Search Report for Application No. EP 16 78 2936 dated May 3, 2018 (12 pages).

Primary Examiner — Nicholas L Foster
(74) Attorney, Agent, or Firm — Harness, Dickey & Pierce, P.L.C.

(57) ABSTRACT

The purpose of the present invention is to improve the handling and usability of rubber only-type gaskets. To achieve said purpose, a gasket molding is obtained by combining a rubber only-type gasket body with a film carrier obtained from a resin film that holds the gasket body in an unbonded state. The gasket molding is characterized in that: in addition to a gasket-holding section for holding the gasket body, the film carrier has temporary tacking sections that are surface-treated to temporarily tack the gasket body to said film carrier; the gasket body has temporary tack-receiving sections that are temporarily tacked to the temporary tacking sections; and the temporary tacking sections and temporary tack-receiving sections are removed from the film carrier (Continued)

and the gasket body when the film carrier and gasket body are punched into the product shapes.

4 Claims, 8 Drawing Sheets

(51) Int. Cl.
    *F16J 15/10*     (2006.01)
    *H01M 8/0276*     (2016.01)
    *H01M 8/0284*     (2016.01)
    *F16J 15/06*     (2006.01)
    *H01M 8/0273*     (2016.01)
    *H01M 8/0286*     (2016.01)
    *B29L 31/26*     (2006.01)
    *B29L 31/34*     (2006.01)

(52) U.S. Cl.
    CPC ............ B29C 45/40 (2013.01); *F16J 15/061* (2013.01); *F16J 15/106* (2013.01); *F16J 15/108* (2013.01); *H01M 8/0273* (2013.01); *H01M 8/0276* (2013.01); *H01M 8/0278* (2013.01); *H01M 8/0284* (2013.01); *H01M 8/0286* (2013.01); *B29C 45/14336* (2013.01); *B29C 2045/1477* (2013.01); *B29C 2045/14459* (2013.01); *B29L 2031/26* (2013.01); *B29L 2031/265* (2013.01); *B29L 2031/3468* (2013.01); *Y02P 70/56* (2015.11)

(56) References Cited

U.S. PATENT DOCUMENTS

| | | | | |
|---|---|---|---|---|
| 5,564,714 A * | 10/1996 | Katsuno | ............. | B25B 27/0028 277/630 |
| 7,001,686 B2 * | 2/2006 | Wells | ................. | H01M 8/0204 429/535 |
| 7,749,635 B2 * | 7/2010 | Kuroki | ................. | F16J 15/0818 277/650 |
| 7,799,484 B2 * | 9/2010 | Kuroki | ................. | F16J 15/0818 429/469 |
| 8,304,119 B2 * | 11/2012 | Kurano | ................. | F16J 15/0806 277/317 |
| 8,833,772 B2 * | 9/2014 | Sasaki | ................... | H05K 5/061 277/630 |
| 9,640,807 B2 * | 5/2017 | Hong | ...................... | C08F 14/18 |
| 2004/0075224 A1 * | 4/2004 | Kuroki | ................. | F16J 15/0818 277/650 |
| 2005/0077683 A1 * | 4/2005 | Comert | ................... | B60R 13/06 277/300 |
| 2006/0131819 A1 * | 6/2006 | Kurano | ................. | F16J 15/0806 277/628 |
| 2007/0148524 A1 * | 6/2007 | Kuroki | ................. | F16J 15/0818 429/71 |
| 2007/0148525 A1 * | 6/2007 | Kuroki | ................. | F16J 15/0818 429/71 |
| 2007/0154769 A1 * | 7/2007 | Kuroki | ................. | F16J 15/0818 429/71 |
| 2007/0190390 A1 * | 8/2007 | Kuroki | ................. | F16J 15/0818 429/479 |
| 2007/0298272 A1 | 12/2007 | Kusakawa et al. | | |
| 2009/0075143 A1 * | 3/2009 | Kurano | ................. | F16J 15/0806 429/407 |
| 2011/0140375 A1 | 6/2011 | Sasaki et al. | | |
| 2014/0077462 A1 | 3/2014 | Hong et al. | | |
| 2018/0163869 A1 * | 6/2018 | Saso | ........................ | F16J 15/10 |
| 2018/0163870 A1 * | 6/2018 | Saso | ................... | H01M 8/0271 |
| 2018/0313448 A1 * | 11/2018 | Nishimura | .......... | H01M 8/0273 |

FOREIGN PATENT DOCUMENTS

| | | |
|---|---|---|
| CN | 103682389 A | 3/2014 |
| JP | 2003-223953 A | 8/2003 |
| JP | 2006-022900 A | 1/2006 |
| JP | 2008-223953 A | 9/2008 |
| JP | 2010-133512 A | 6/2010 |
| JP | 2014-060133 A | 4/2014 |
| WO | WO-2008-126618 A1 | 10/2008 |

\* cited by examiner

GASKET MOLDED PRODUCT AND METHOD OF MANUFACTURING THE SAME

CROSS-REFERENCE TO RELATED APPLICATIONS

This application is a U.S. National Stage Application of International Application No. PCT/JP2016/059548, filed on Mar. 25, 2016, and published in Japanese as WO 2016/170914 A1 on Oct. 27, 2016 and claims priority to Japanese Application No. 2015-089405, filed on Apr. 24, 2015. The entire disclosures of the above applications are incorporated herein by reference.

BACKGROUND OF THE INVENTION

Field of the Invention

The present invention relates to a gasket molded product according to a seal technique, and a method of manufacturing the same. The gasket according to the present invention is used, for example, as a gasket for a fuel battery, or a general gasket for the other intended use.

Description of the Conventional Art

The gasket for the fuel battery includes various gaskets having various structures such as a rubber only type gasket which is constructed by a gasket single part made of a rubber-like elastic material (a rubber), a separator integrated gasket which is obtained by integrally molding the gasket made of the rubber-like elastic material in a separator, or a GDL integrated gasket which is obtained by integrally molding the gasket made of the rubber-like elastic material in a gas diffusion layer (GDL).

These gaskets have respective characteristics. However, since request for cost reduction is severe in recent years, a rubber only type gasket which can satisfy the request is going to be paid attention.

Figure 8A:
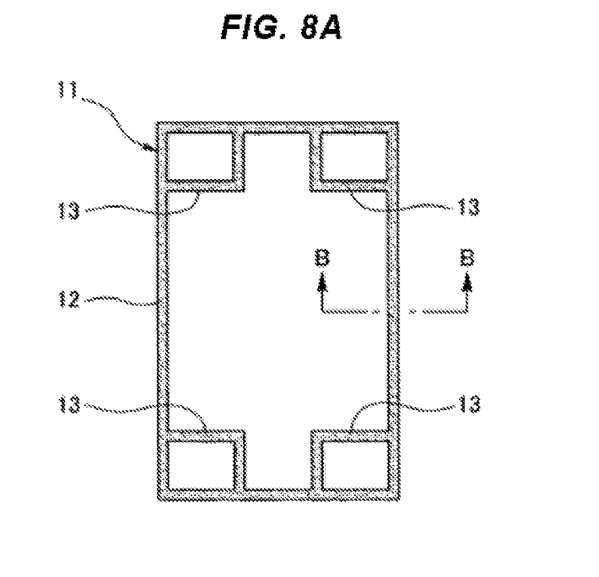
FIG. 8A is a plan view of the same and FIG. 8B is an enlarged cross sectional view along a line B-B in FIG. 8A.
Figure 8B:
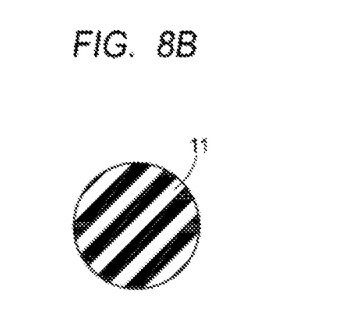

The rubber only type gasket is structured, for example, as shown in FIGS. 8A and 8B.

More specifically, a gasket 11 is formed into a flat surface shape (a flat plate shape) as a whole, and an outer peripheral seal portion 12 sealing a periphery of a reaction surface of a fuel battery over all the periphery is provided like a frame shape. Further, since it is necessary to partition the reaction surface of the fuel battery and each of manifold portions, an inside seal portion 13 is integrally formed in an inner side of the outer peripheral seal portion 12. A cross sectional shape of the gasket 11 is formed into a circular cross section as shown in FIG. 8B.

However, in the gasket 11 for the fuel battery, there is room for further improvement in the following point.

More specifically, the gasket 11 for the fuel battery is generally set to such a size as 400 mm×300 mm in its flat surface shape, and a cross sectional shape (a wire diameter) thereof is on the contrary set to be small. Therefore, twist tends to be generated in the gasket 11 single part when being released from the metal mold, when being carried or when being stacked. Therefore, a handling workability (a handling performance) thereof is not good.

The present invention is made by taking the above point into consideration, and an object of the present invention is to improve a handling workability of a rubber only type gasket.

SUMMARY OF THE INVENTION

In order to achieve the object mentioned above, a gasket molded product according to the present invention is a gasket molded product constructed by a combination of a rubber only type gasket main body, and a film carrier which is made of a resin film retaining the gasket main body in a non-bonded state, characterized in that the film carrier has a temporal tacking portion which temporally tacking the gasket main body to the film carrier and is formed by a surface treatment, in addition to a gasket retaining portion which retains the gasket main body, and the gasket main body has a temporal tacked portion which is temporally tacked to the temporal tacking portion.

In the present invention having the structure mentioned above, the gasket molded product is constructed by the combination of the rubber only type gasket main body, and the film carrier which is made of the resin film retaining the gasket main body, and the gasket main body is retained by the film carrier. As a result, the twist is hard to be generated even in the case that the gasket main body has a small cross section and tends to be bent. Therefore, it is possible to improve a handling workability of the gasket main body. Since the gasket main body is retained in a non-bonded state by the film carrier, the gasket main body can be detached from the film carrier as occasion demands. However, if the gasket main body is completely free from the film carrier, there is fear that the gasket main body falls away from the film carrier when the metal mold is opened or when the gasket main body is thereafter released from the metal mold. Consequently, the present invention devises a countermeasure by the following structure.

More specifically, the film carrier made of the resin film is provided with the temporal tacking portion formed by the surface treatment for temporally tacking the gasket main body to the film carrier in addition to the gasket retaining portion for retaining the gasket main body, and the gasket main body is provided with the temporal tacked portion which is temporally tacked to the temporal tacking portion, whereby the temporal tacked portion is closely attached to the temporal tacking portion. As the surface treatment for temporally tacking, there can be thought, for example, a bonding treatment and a surface modification (a plasma treatment and a corona discharge treatment) as long as the molded rubber is not easily peeled off.

Therefore, according to the structure, since the gasket main body is temporally tacked to the film carrier, it is possible to prevent the gasket main body from falling away from the film carrier when the metal mold is opened or when the gasket main body is thereafter released from the metal mold.

Further, in order to make the gasket main body hard to fall away from the film carrier, the gasket retaining portion provided in the film carrier is preferably formed as a stereoscopic portion having such a shape that a part on a plane of the resin film is deformed along an outer shape of the gasket main body. According to this structure, a part of the gasket main body is fitted into the stereoscopic portion and is positioned on a plane. Therefore, the gasket main body can be firmly retained by the film carrier.

The gasket main body according to the present invention is used, for example, as the gasket for the fuel battery. Since the number of stack lamination is larger in the fuel battery, a small thickness is required in the gasket main body. Since the gasket main body having the small thickness tends to be twisted, the handling workability is not good. Therefore, it is extremely effective for achieving efficiency of a stacking work to improve the handling workability by combining the gasket main body with the film carrier which is made of the resin film, in a field of the gasket for the fuel battery which tends to be twisted due to the small thickness as mentioned above.

A method of manufacturing the gasket molded product sequentially executes a step of providing a temporal tacking portion by applying a surface treatment to a part on a plane of a resin film which is set to a film carrier, a step of forming a gasket main body by a metal mold in a state in which the resin film having the temporal tacking portion is pinched in a partition portion of the metal mold, forming a stereoscopic portion in the resin film by deforming a part on the plane of the resin film along an inner surface of a cavity of the metal mold by a molding material filling pressure and integrally forming a temporal tacked portion in the gasket main body so as to closely attach the temporal tacked portion to the temporal tacking portion, and a step of opening the mold after the formation of the gasket main body and thereafter simultaneously taking out the gasket main body and the resin film from the metal mold. The film carrier made of the resin film is initially formed into a flat surface shape (a flat structure), however, is partly formed as a stereoscopic shape by utilizing the molding material filling pressure, and is fitted to the gasket main body at a position which is formed as the stereoscopic shape. Therefore, a retention force is high. The resin film may be supplied from a roll which is formed such that a film for a lot of gaskets is continuously provided.

Effect of the Invention

According to the present invention, since the rubber only type gasket main body is combined with the film carrier which is made of the resin film, and the temporal tacking structure is provided according to the surface treatment, it is possible to improve the handling workability of the rubber only type gasket.

BRIEF EXPLANATION OF THE DRAWINGS

FIGS. 1A to 1C are views showing a gasket molded product according to an embodiment of the present invention, in which

FIGS. 3A to 3C are views showing a state after a punching process of the gasket molded product, in which

FIGS. 7A and 7B are views showing a gasket molded product according to the other embodiment of the present invention, in which FIGS. 8A and 8B are views showing a gasket according to the conventional example, in which

DETAILED DESCRIPTION OF PREFERRED EMBODIMENTS

The following embodiments are included in the present invention.

(1) A rubber simple product is molded by using a film carrier which can be deformed into a metal mold shape according to a mold temperature and a molding pressure. A gasket with a film carrier can be prevented from being fallen away and peeled from the film carrier when being released from the metal mold by applying a surface treatment to a part of the film so as to increase a degree of close attachment, and can be released from the film carrier by removing the temporal tacking portion when finally punching into a product supplied shape.

(2) Since the product after the formation always exists on the film carrier, the handing property is widely improved. Further, automation of a line can be easily considered by controlling the gasket itself falling away and peeling from the film carrier. Further, burrs on a parting line can be suppressed by mold clamping the film carrier.

(3) The film carrier to which the surface treatment is previously applied is supplied to the molding metal mold. The shape of the carrier at this time is not limited as long as the previous surface treatment can be applied, that is, the shape may be formed into a cut plate or a roll. The gasket and the film carrier are not bonded, and the temporal tacking portion for preventing the falling-away and the peeling when being released from the metal mold. The previous surface treatment is applied partly on the film in relation to the temporal tacking portion. The temporal tacking portion is removed when the film carrier is punched out into the product shipping shape. The film carrier is handled as a base in each of steps (secondary vulcanization and inspection) which are generated after the gasket formation.

(4) The rubber simple product is molded by using the film carrier which can be deformed into the metal mold shape according to the mold temperature and the molding pressure. The film carrier is supplied by a roll, is treated by the roll from the supply to a forming machine to the recovery after the gasket formation, and is supplied by the roll when assembling a fuel battery stack.

It is possible to prevent the falling-away and the peeling from the film carrier when being removed from the metal mold by applying the surface treatment to a part of the film as the previous treatment at the molding time so as to increase the degree of close attachment. Further, the rubber of the temporal tacking portion is set to be higher than the seal lip height, thereby preventing the seal lip from coming into contact with a back surface of the film carrier when being wound around the roll. It is possible to release from the film by removing the temporal tacking portion by punching or half cutting when being assembled in the fuel battery stack.

(5) The automation of the line can be achieved when being molded by supplying the product by the roll, and the automation can be also expected in an assembling line of the fuel battery stack, so that an assembling cost can be widely reduced. Further, the burrs on the parting line can be suppressed by mold clamping the film carrier.

Embodiments

Next, a description will be given of an embodiment according to the present invention with reference to the accompanying drawings.

Figure 1A:
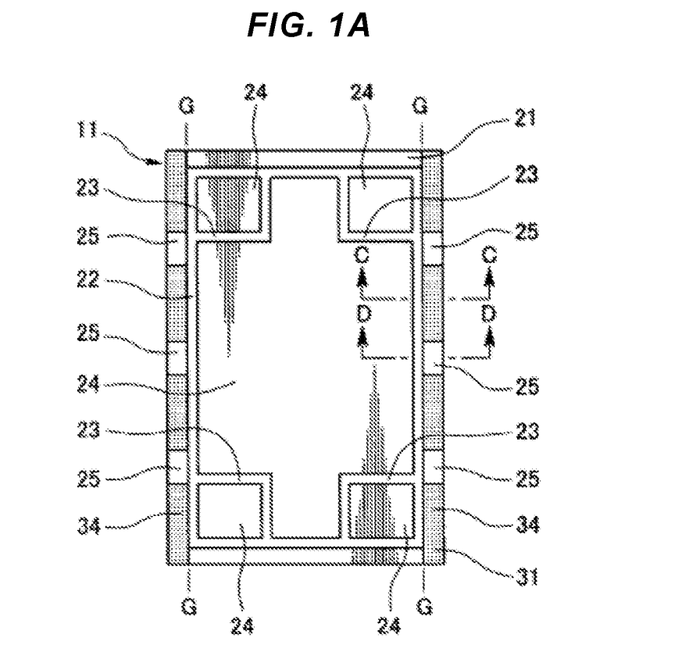
FIG. 1A is a plan view.
Figure 1B:
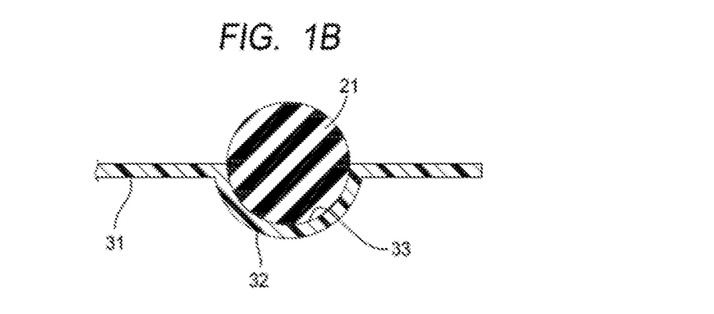
FIG. 1B is an enlarged cross sectional view along a line C-C in FIG. 1A
Figure 1C:
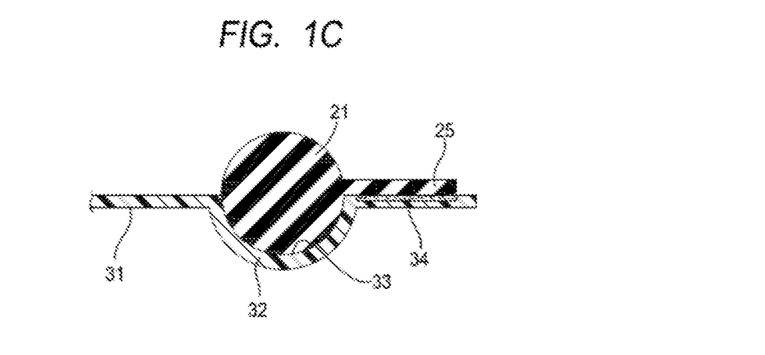
FIG. 1C is an enlarged cross sectional view along a line D-D in FIG. 1A.

As shown in FIGS. 1A to 1C, a gasket (a gasket molded product) 11 according to the embodiment is constructed by a combination of a rubber only type gasket main body 21, and a film carrier 31 which is made of a resin film retaining the gasket main body 21 in a non-bonded state. The gasket main body 21 is used as a gasket for a fuel battery.

The gasket main body 21 is formed into a flat surface shape (a flat plate shape) by a predetermined rubber-like elastic material (for example, VMQ, PIB, EPDM and FKM), and integrally has a frame-shaped outer peripheral seal portion 22 for sealing around a reaction surface of a fuel battery over all the periphery and an inside seal portion 23 for sealing a partition portion between the reaction surface of the fuel battery and each of the manifolds, as constituent elements thereof. A cross sectional shape of the gasket main body 21 is formed into a circular cross section as shown in FIG. 1B. Reference numeral 24 denotes a penetration portion (a space portion) which passes through the gasket main body 21 in its thickness direction. The gasket main body 21 is formed into a rectangular shape in a plane, is set its planar size to have an outer shape with approximately 400 mm (vertical)×approximately 300 mm (horizontal), and is set its thickness, that is, its wire diameter to be approximately 1 mm. The rubber material more preferably employs a material which can be formed at a low temperature so as to use an inexpensive film, since the resin film is thermally deformed.

A cross sectional shape of the gasket main body 21 is not particularly limited, but can employ a rectangular cross sectional shape, a trapezoidal shape, a triangular shape, a one-face lip shape (a shape obtained by integrally forming a seal lip having a circular arc cross sectional shape (a semicircular shape) or a chevron cross sectional shape on an upper surface of the gasket main body 21 having a rectangular cross sectional shape), or a both-face lip shape (a shape obtained by integrally forming a seal lip having a circular cross sectional shape (a semicircular shape) or a chevron cross sectional shape on each of upper and lower surfaces of the gasket main body 21 having a rectangular cross sectional shape), in addition to a circular cross sectional shape (a perfect circle shape, an oval shape or an oblong shape).

The film carrier 31 is formed into a flat surface shape (a flat plate shape) by a predetermined resin film, and is formed into a rectangular flat surface which is one size larger than the gasket main body 21. The resin film employs, for example, a polypropylene film having a thickness of 200 μm, and is used by cutting the polypropylene film into a flat surface shape having the size mentioned above. General resin materials such as polyethylene and polystyrene can be used in addition to the polypropylene for the resin film. A thickness of the film is preferably set to be approximately between 50 μm and 300 μm in correspondence to the wire diameter and the cross sectional shape of the gasket main body 21. The film material is not limited as long as it has a heat resistance (is not soluble) in relation to a molding temperature of the rubber and is thermally deformable into the metal mold shape, but preferably employs the polypropylene and the polyethylene as mentioned above since the film carrier 31 serves as a function of carrying and handling and the inexpensive film can be selected.

The film carrier 31 has a gasket retaining portion 32 for retaining the gasket main body 21 on a part on a plane thereof. The gasket retaining portion 32 is provided as a stereoscopic shape in which a part on a plane of the resin film is deformed along an outer shape of the gasket main body 21 (an outer contour line in the cross sectional shape of the gasket main body 21), and is formed into a shape having the same planar shape as the gasket main body 21. A part (a part in a thickness direction) of the gasket main body 21 is fitted into the gasket retaining portion 32 in a non-bonded state. Since the cross sectional shape of the gasket main body 21 is formed into the circular cross section as mentioned above in the embodiment, a cross sectional shape of the gasket retaining portion 32 is formed into a circular arc cross sectional shape (a semicircular shape) in correspondence thereto. A lower half position in one side in a thickness direction of the gasket main body 21 is fitted into a space portion 33 which is provided in a back surface side of the gasket retaining portion 32 and is formed into a groove shape, on the basis of the provision of the gasket retaining portion 32 having the circular arc cross sectional shape as mentioned above.

Since the gasket main body 21 is not bonded to the film carrier 31, the gasket main body 21 can be detached from the film carrier 31 when being stacked. In the case that the gasket main body 21 is formed in a state in which the film carrier 31 is inserted into a metal mold 41 which forms the gasket main body 21 as mentioned later, the gasket main body 21 is set to a state of being adhered to the film carrier 31 due to an adhesive property if the formed gasket main body 21 is provided with the adhesive property. The adhesion has such a small adhesive force as to be detached by a chucking device. Therefore, in this case, the rubber only type gasket main body 21 is not bonded to the film carrier 31 which is made of the resin film, but is adhered in such a manner as to be capable of being peeled off.

Figure 2A:
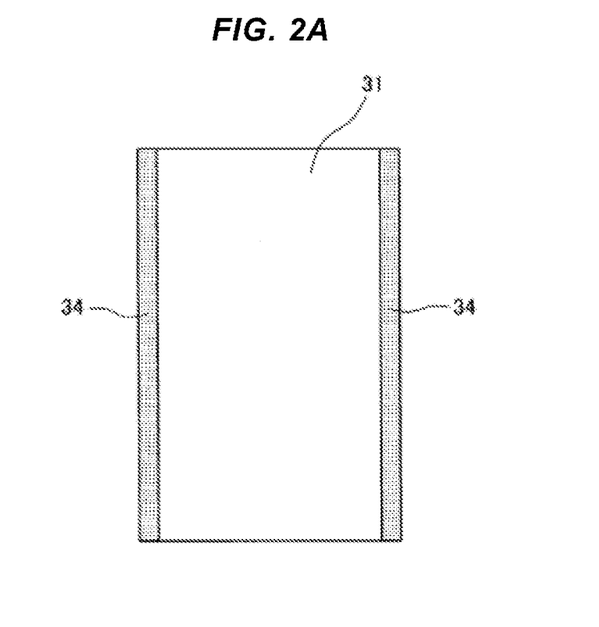
FIG. 2A is a plan view showing a single part state of a film carrier in the gasket molded product.
Figure 2B:
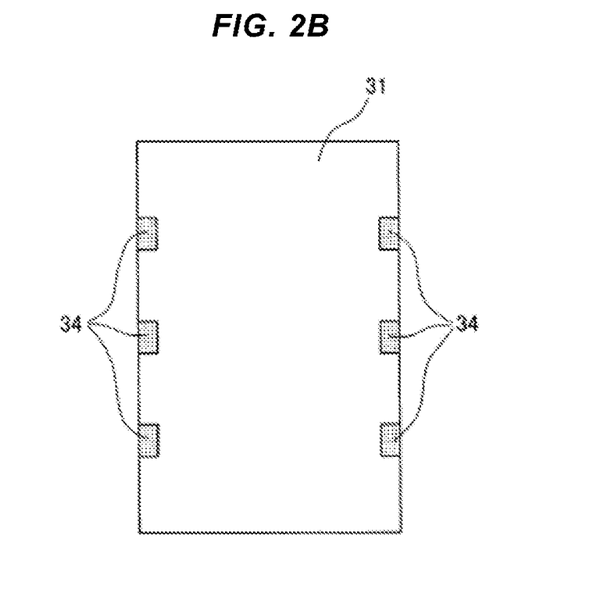
FIG. 2B is a plan view showing the other example of the film carrier.

In addition, the film carrier 31 has a temporal tacking portion 34 for temporally tacking the gasket main body 21 to the film carrier 31. The temporal tacking portion 34 is provided as a portion to which the rubber of the gasket main body 21 tends to be closely attached (adhered) by applying a surface treatment such as a bonding treatment and a surface modification (a plasma treatment and a corona discharge treatment) to a part on a plane of the resin film. In the embodiment, the temporal tacking portion 34 is provided as a band-like portion in each of longitudinal side edge portions of the film carrier 31, as shown in FIG. 2A, however, may be provided as being scattered as shown in FIG. 2B.

Further, in correspondence to the temporal tacking portion 34 provided in the film carrier 31, the gasket main body 21 is provided with a temporal tacked portion 25 which is temporally tacked to the temporal tacking portion 34 as shown in FIGS. 1A and 1C, and a plurality of temporal tacked portions 25 are provided like tongue pieces in the longitudinal side edge portions of the gasket main body 21 in the embodiment.

In the gasket 11 having the structure mentioned above, since the rubber only type gasket main body 21 is retained by the film carrier 31 which is made of the resin film, the gasket main body 21 is hard to be twisted when the gasket 11 is carried, and the gasket 11 can be easily carried. Further, since the gasket main body 21 is not bonded to the film carrier 31, the gasket main body 21 can be easily detached from the film carrier 31 when being stacked. Therefore, it is possible to improve a handling workability of the gasket 11.

Further, since the gasket retaining portion 32 having the stereoscopic shape is provided in the film carrier 31 and a part of the gasket main body 21 in the thickness direction is fitted into the gasket retaining portion 32, the gasket main body 21 is positioned on a plane in relation to the film carrier 31. Therefore, since the gasket main body 21 is not displaced in relation to the film carrier 31 when the gasket 11 is carried, the gasket main body 21 can be firmly retained by the film carrier 31.

In addition, the film carrier 31 made of the resin film is provided with the temporal tacking portion 34 which is provided for temporally tacking the gasket main body 21 in relation to the film carrier 31 and is formed by the surface treatment, in addition to the gasket retaining portion 32 for retaining the gasket main body 21, and the gasket main body 21 is provided with the temporal tacked portion 25 which is temporally tacked to the temporal tacking portion 34, so that the temporal tacked portion 25 is temporally tacked to the temporal tacking portion 34. As a result, it is possible to prevent the gasket main body 21 from falling away from the film carrier 31 when the metal mold is opened or when the gasket main body 21 is thereafter released from the mold.

Figure 3A:
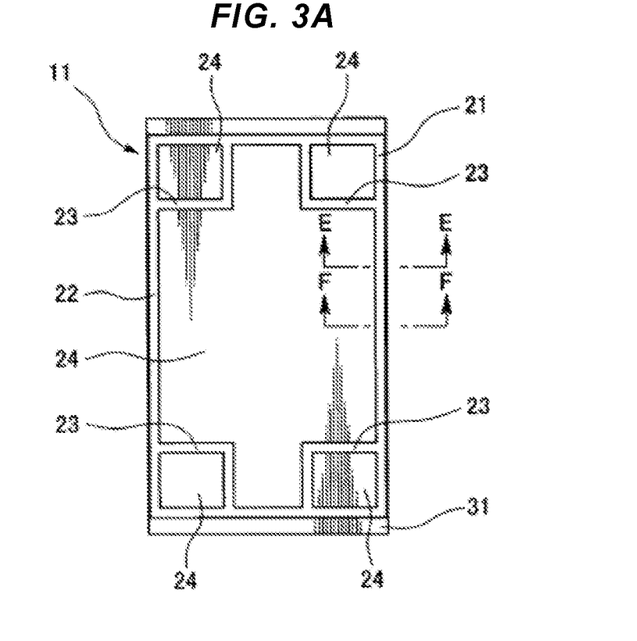
FIG. 3A is a plan view.
Figure 3B:
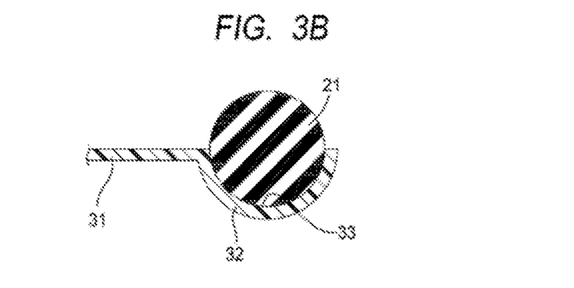
FIG. 3B is an enlarged cross sectional view along a line E-E in FIG. 3A
Figure 3C:
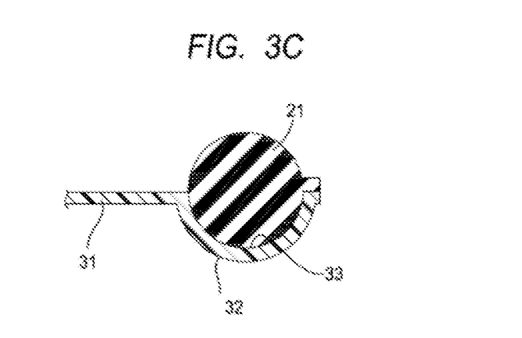
FIG. 3C is an enlarged cross sectional view along a line F-F in FIG. 3A.

The temporal tacking portion 34 and the temporal tacked portion 25 are cut and removed after the formation of the gasket 11 constructed by the combination of the gasket main body 21 and the film carrier 31 (before being shipped after the formation, or before the stacking assembly after the shipping). In the embodiment, since the temporal tacking portion 34 is provided like the band in each of the longitudinal side edge portions of the film carrier 31 as mentioned above, the gasket molded product 11 is cut by a cut line shown by a line G-G for cutting and removing the temporal tacking portion 34, thereby forming a shape as shown in FIGS. 3A, 3B and 3C. Therefore, the gasket main body 21 comes to a state in which the gasket main body 21 is retained only by the gasket retaining portion 32.

With regard to the cross sectional shape of the gasket main body 21 and the cross sectional shape of the gasket retaining portion 32 corresponding thereto, various cross sections can be thought in correspondence to used conditions of the gasket main body 21.

Next, a description will be given of a method of manufacturing the gasket 11 mentioned above. A metal mold for injection molding the rubber only type gasket main body 21 is used for manufacturing.

In the process, first of all, the film carrier 31 is prepared, and the temporal tacking portion 34 is provided by applying the surface treatment to a part on a plane of the film carrier 31 (refer, for example, to FIG. 2A). The bonding treatment or the surface modification (the plasma treatment and the corona discharge treatment) is executed as described above as the surface treatment.

Figure 4A:
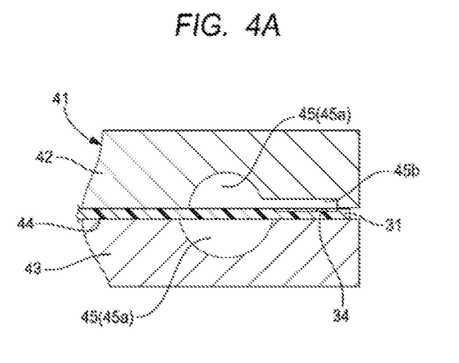
FIGS. 4A to 4D are process explanatory views of a method of manufacturing the gasket molded product according to an embodiment of the present invention.

Next, as shown in FIG. 4A, the metal mold 41 is clamped in a state in which the film carrier 31 is sandwiched in parting portions 44 of the metal mold 41. The metal mold 41 has a combination of an upper mold (one split mold) 42 and a lower mold (the other split mold) 43, and cavity portions 45 are correspondingly provided half by half in the parting portions 44 of both the molds 42 and 43. The cavity portion 45 is provided with a temporal tacked portion forming cavity portion 45b for forming the temporal tacked portion 25 having the tongue piece shape, in addition to a gasket forming cavity portion 45a for forming the gasket main body 21. Since the film carrier 31 is initially formed into the flat surface shape in its whole surface, the film carrier 31 is in a state of cutting across the cavity portion 45.

Figure 4B:
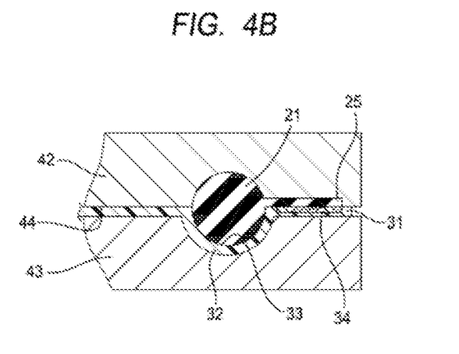

Next, as shown in FIG. 4B, the gasket main body 21 is formed together with the temporal tacked portion 25 by filling a molding material (a rubber material) for forming the gasket main body 21 in the cavity portion 45 and heating and pressurizing the molding material. When the molding material is filled in the cavity portion 45, the film carrier 31 is pressed to an inner surface of the cavity portion 45 in its part on the plane by a molding material filling pressure, and is deformed (plastically deformed) into a shape which is along the inner surface of the cavity portion 45. As a result, the gasket retaining portion 32 having the stereoscopic shape is formed. Further, the temporal tacked portion 25 is closely attached to the temporal tacking portion 34, and the gasket main body 21 is accordingly temporally tacked to the film carrier 31.

Figure 4C:
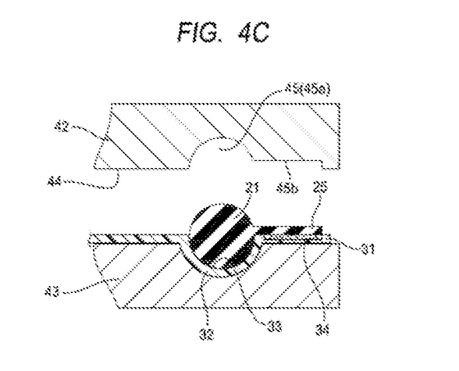
Figure 4D:
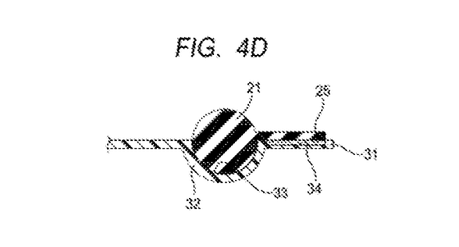

Next, as shown in FIG. 4C, the mold is opened after the formation of the gasket main body 21, and the gasket main body 21 and the film carrier 31 are simultaneously taken out of the metal mold 41 and the manufacturing step of the gasket molded product 11 is finished as shown in FIG. 4D.

Figure 5A:
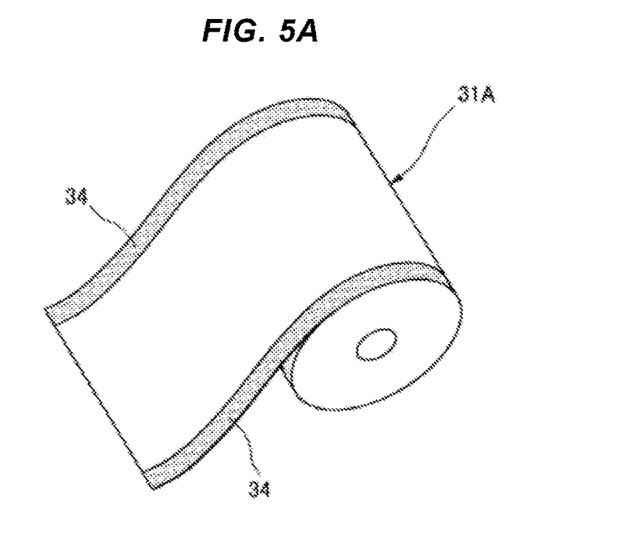
FIGS. 5A and 5B are explanatory views of a film roll body.
Figure 5B:
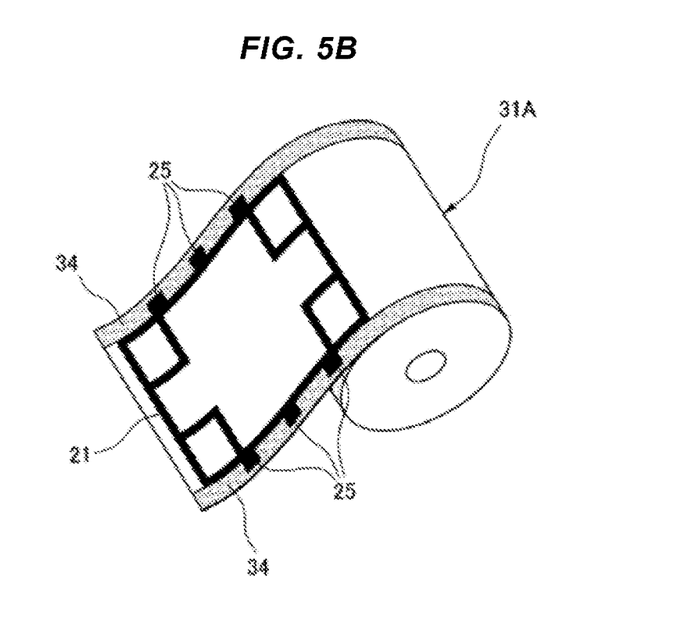
Figure 6:
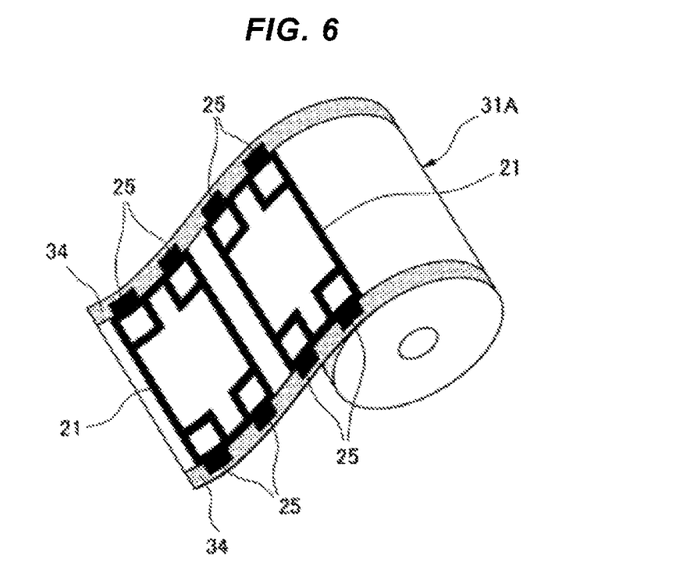
FIG. 6 is an explanatory view showing the other example of the film roll body.

When the film carrier 31 is supplied to the metal mold 41, it can be thought to prepare a resin film roll body 31A in which a lot of film carriers 31 are continuously formed in a line for a lot of gaskets, and continuously supply the film carrier 31 to the metal mold 41 with the roll body 31A, as shown in FIG. 5A. The temporal tacking portion 34 may be previously provided in the roll body 31A, or the gasket main body 21 may be formed on a plane of the film carrier 31 in a state of the roll body 31A as shown in FIG. 5B. Further, in the case that the temporal tacked portion 25 is provided in the longitudinal side edge of the gasket main body 21 formed into the rectangular plane shape, a direction of the gasket main body 21 in relation to the roll body 31A is a direction shown in FIG. 5B, however, in the case that the temporal tacked portion 25 is provided in a short side edge of the gasket main body 21 formed into the rectangular plane shape, the direction of the gasket main body 21 in relation to the roll body 31A is a direction shown in FIG. 6. Therefore, a width of the roll body 31A is defined in correspondence to the short width of the gasket main body 21 in the former case, and is defined in correspondence to the long width of the gasket main body 21 in the latter case.

Figure 7A:
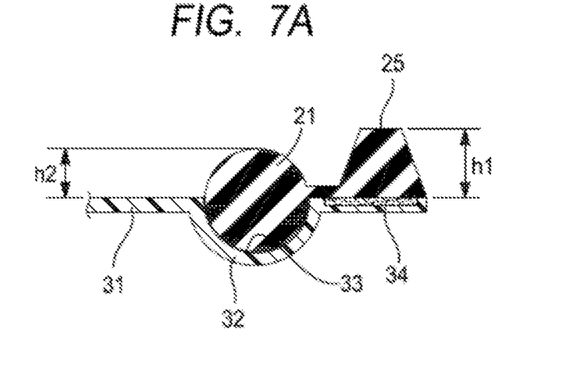
FIG. 7A is a cross sectional view of a substantial part thereof.
Figure 7B:
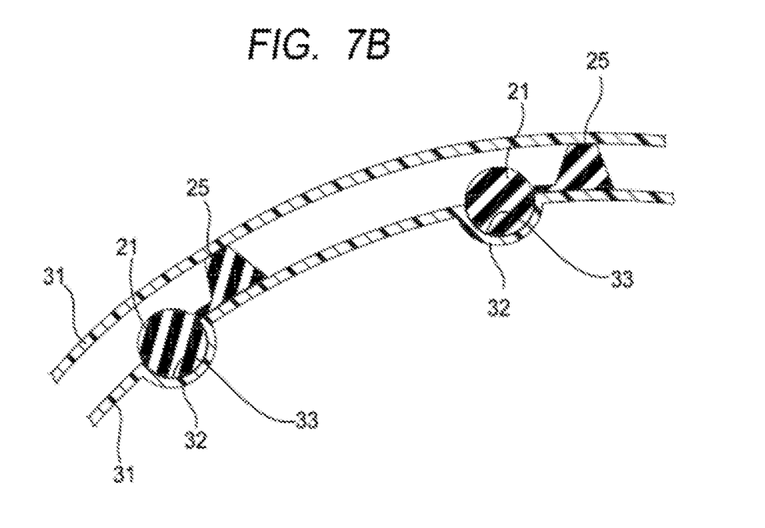
FIG. 7B is an explanatory view of a roll winded state thereof.

The film carrier 31 may be supplied with the roll as described above, and the roll supply may be employed from the supply of the film carrier 31 to the metal mold 41 to the recovery after the formation of the gasket main body 21, and may be employed when the fuel battery stack is assembled. Further, in this case, since the film carrier 31 is rewound like the roll after the gasket main body 21 is formed on the plane of the film carrier 31, a height h1 of the temporal tacked portion 25 may be set to be larger than a height of the gasket main body 21 (a height from the plane of the film carrier 31) h2 as shown in FIG. 7A, whereby the gasket main body 21 does not come into contact with the back surface of the film carrier 31 which is wound around the outer peripheral side thereof when being rewound like the roll as shown in FIG. 7B. In this case, it is possible to prevent such a problem that the gasket main body 21 is irregularly deformed by the winding force. At this time, the temporal tacked portion 25 serves as a spacer in a winding and laminating direction (a radial direction of the roll body 31A) in addition to the temporal tacking function.

What is claimed is:
1. A gasket assembly, comprising:
    a gasket main body; and
    a film carrier that is configured to retain the gasket main body in a non-bonded state,
    wherein the film carrier includes a gasket main body seat that is shaped to correspond to a shape of the gasket main body, and that is configured for receipt of the gasket main body therein;

the film carrier includes, at a location positioned outboard from the gasket main body seat, a tacking portion having an adhesive property that is greater than remaining portions of the film carrier; and the gasket main body includes a plurality of tabs that extend outward from the gasket main body and are configured to adhere to the tacking portion.

2. The gasket assembly according to claim 1, wherein the gasket main body is configured for use in a fuel battery which is embedded in a fuel battery stack.

3. A method of manufacturing the gasket assembly according to claim 1, comprising:

forming the tacking portion on the film carrier by applying a surface treatment to an edge of the film carrier;

placing the film carrier including the tacking portion in a metal mold including a cavity collectively defined by a first split mold and a second split mold such that the edge of the film carrier is clamped between the first split mold and the second split mold;

forming the gasket main body and the plurality of tabs by injecting a gasket material into the metal mold, a pressure of the gasket material deforming the film carrier to form the gasket main body in the film carrier;

opening the metal mold after the formation of the gasket main body and removing the gasket main body and the film carrier from the metal mold.

4. The method of manufacturing the gasket molded product according to claim 3, further comprising supplying the film carrier by a roll.

* * * * *